Patented Feb. 14, 1939

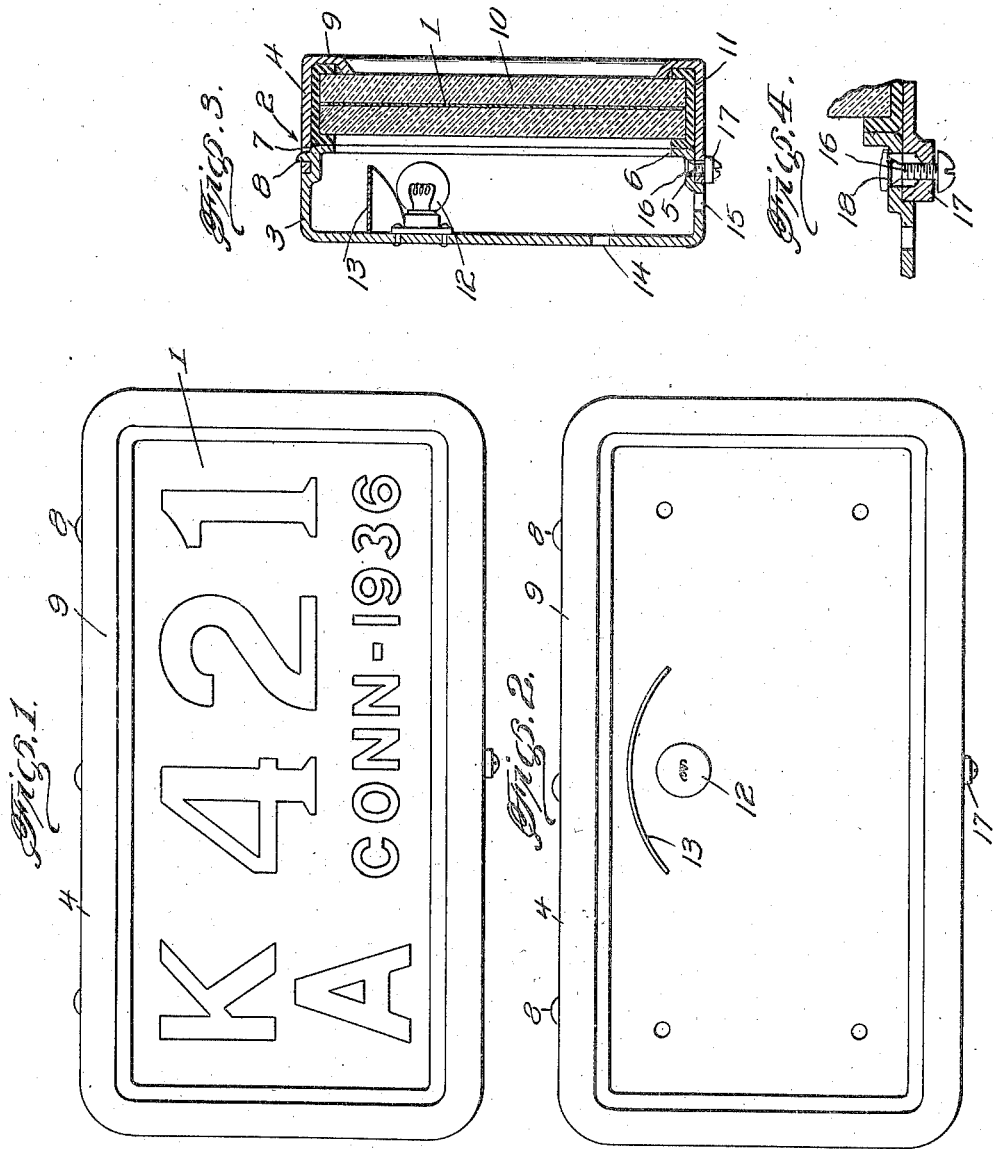

2,147,560

UNITED STATES PATENT OFFICE 2,147,560

AUTOMOBILE LICENSE HOLDER

Louis A. Schupbach, Waterbury, Conn.

Application November 23, 1936, Serial No. 112,367

2 Claims. (Cl. 40—132)

This invention relates to automobile license or registration and holders therefor and has for the primary object the provision of inexpensive license or registrations which will materially decrease manufacturing costs to states and holders for displaying said license or registrations so that they may be read from a maximum distance and which will protect said license or registration against destruction and deterioration caused by weather elements.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a license or registration and a holder therefor and constructed in accordance with my invention.

Figure 2 is a front elevation illustrating one of the sections of the holder.

Figure 3 is a transverse sectional view illustrating the device.

Figure 4 is a detail sectional view illustrating the fastening means for securing the sections of the holder together.

Referring in detail to the drawing, the numeral 1 indicates a license or registration for an automobile constructed from semitransparent material such as a suitable quality of paper and has printed or otherwise applied thereon numbers and characters to meet with the requirement of some selected state. A license or registration of the character described can be manufactured at a very low cost, eliminating expensive machinery for the making of license or registrations by states.

The holder for the license or registration is indicated by the numeral 2 and consists of sections 3 and 4 detachably connected with each other. The section 3 is preferably in the form of an open front casing having walls thereof offset to form seats 5 and flanges 6. The section 4 is of a frame-like construction to tightly fit the seats 5 and has openings 7 to receive tongues or projections 8. The framelike section 4 has flanges 9 and when the sections 3 and 4 are assembled the flanges 9 and 6 are spaced to receive transparent panels 10 between which is positioned the license or registration 1. A gasket 11 constructed of some suitable cushioning material receives the transparent panels and engages with the section 4 and the flanges 6 and 9 for securely fastening the panels in the holder to prevent unnecessary noises and to effectively establish a seal between the panels and the section 4. The section 3 has an electric lamp 12 mounted therein and which is furnished from any suitable electric source carried by the automobile. A reflector 13 is positioned over the electric lamp. The rear wall of the holder has openings 14 to receive bolts or like fasteners for mounting the holder to the usual license plate supporting bracket of a motor vehicle. The section 3 has vent openings 15 in the lower wall thereof.

The lower wall of the section 3 of the holder and also the lower wall of the section 4 have aligned openings through which extends a bolt 16. An offset portion 17 is integral with the section 4 and has a screw threaded opening aligning with the first-named aligning openings. The bolt 16 is threaded in the opening of the offset 17 with its kerfed head disposed outwardly of the holder. The other end of the bolt is offset, as shown at 18 after the placing of the bolt through the openings, to prevent the bolt from moving entirely out of the holder 2 and which may move into the offset 17 when desiring to detach the section 4 from the section 3 of the holder.

The head 18 of the bolt 16 is of a size to have a sliding fit with the walls of the openings in the sections 3 and 4 of the casing so that when the offset 18 of the bolt contacts the walls of the opening in the section 3, said section 3 will be prevented from swinging away from the section 4. The bolt is threaded in the offset 17 formed on the section 4. To free the section 3, the bolt is rotated until the offset end 18 thereof moves into the recess of the offset 17. The section 3 then may be swung away from the section 4.

Having described the invention, I claim:

1. A holder for automobile licenses and the like, comprising a casing including a body section and a frame section, the frame section being hinged to the body section, means for supporting and displaying a license in said frame section, an offset formed on the marginal portion of the frame section to externally overlap the adjacent marginal portion of the body section in the closed relation of the sections, said offset portion of the body section having an opening therethrough, the outer portion of said opening being screw threaded and the inner portion being enlarged in diameter, the adjacent overlapping portion of the body section having an opening therethrough of the same diameter and registering with the inner portion of said opening in the offset of the frame section, and a screw-bolt fitted and working in the screw threaded outer portion of the opening of the offset and having its inner end portion enlarged to a diameter substantially that of the inner portion of the opening of the offset and the registered opening of the body section, said bolt being of a length whereby the enlargement of its inner end portion enters the opening of the body section when the bolt is moved inwardly to lock the sections in closed relation, said enlargement of the bolt being received in the enlarged inner portion of the opening of the offset when the bolt is moved outwardly clear of the opening in the body section.

2. A holder for automobile licenses and the like, comprising a casing including a body section and a frame section, the frame section being detachably hinged to the body section and having provision for the detachable mounting of the license panel therein, and means for releasably locking said sections in closed relation, said means including overlapped meeting marginal portions of the sections, the external overlapped portion of the one section being offset outwardly, said offset having an aperture therethrough, the outer portion of the aperture being screw threaded and the inner portion enlarged in diameter, the adjacent overlapped portion of the other section having an aperture therethrough of the same diameter and registering with the inner portion of the opening of the offset, and a screw-bolt fitted and working in the screw threaded portion of the opening of the offset, the inner end portion of said screw-bolt being enlarged to the diameter substantially that of the enlarged portion of the opening of the offset and the registered opening in the companion section, said bolt being of a length whereby the enlargement at its inner end enters the opening of the interior overlapped section portion when the bolt is adjusted inwardly, said enlargement of the bolt being received in the enlargement of the opening of the offset when the bolt is adjusted outwardly clear of the interior overlapped portion of the companion body section.

LOUIS A. SCHUPBACH.